United States Patent [19]

Oka

[11] Patent Number: 5,448,741

[45] Date of Patent: Sep. 5, 1995

[54] PERSONAL COMPUTER CAPABLE OF CHANGING BOOT PRIORITY

[75] Inventor: Mayumi Oka, Tokyo, Japan

[73] Assignee: Kabushiki Kaisha Toshiba, Kawasaki, Japan

[21] Appl. No.: 261,876

[22] Filed: Jun. 17, 1994

Related U.S. Application Data

[63] Continuation of Ser. No. 128,218, Sep. 29, 1993, abandoned, which is a continuation of Ser. No. 786,795, Nov. 1, 1991, Pat. No. 5,274,816.

[30] Foreign Application Priority Data

Nov. 2, 1990 [JP] Japan .................................. 2-295365
Nov. 30, 1990 [JP] Japan .................................. 2-340406

[51] Int. Cl.⁶ .............................................. G06F 9/445
[52] U.S. Cl. ................................ 395/700; 364/DIG. 1; 364/280.2; 364/237.3
[58] Field of Search ........................................ 395/700

[56] References Cited

U.S. PATENT DOCUMENTS 5,210,875 5/1993 Bealkowski et al. ......... 366/DIG. 1

OTHER PUBLICATIONS

Dell 486D Systems, User's Guide, 1988–1992, pp. 2–3,-2–10,2–17.
Toshiba T1600 Portable Personal Computer User's Manual, Sep. 1988.
T1000 User's Manual, Internal 768KB Memory Expansion Board (Second Edition), Oct. 1987, pp. 2–8–2–11.

Primary Examiner—Thomas M. Heckler
Attorney, Agent, or Firm—Cushman, Darby & Cushman

[57] ABSTRACT

A boot process is performed from one of a floppy disk drive, a detachable hard disk drive, and a DOS-ROM. The boot priority is changed in accordance with the connection state of the detachable hard disk drive. The boot priority can be changed quickly by depressing a function key from a normal boot mode to an HDD boot mode or vice versa.

7 Claims, 9 Drawing Sheets

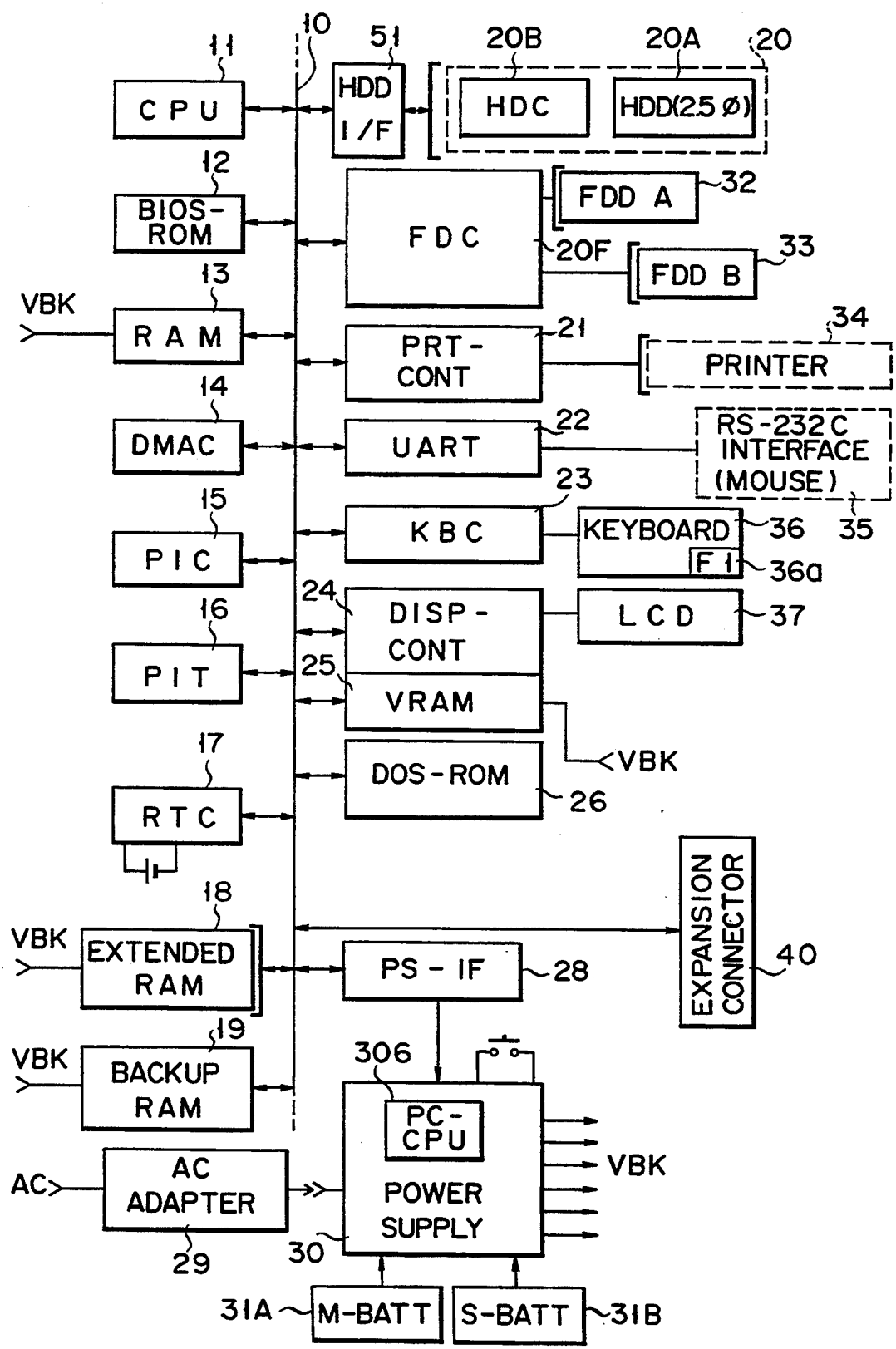
F I G. 1

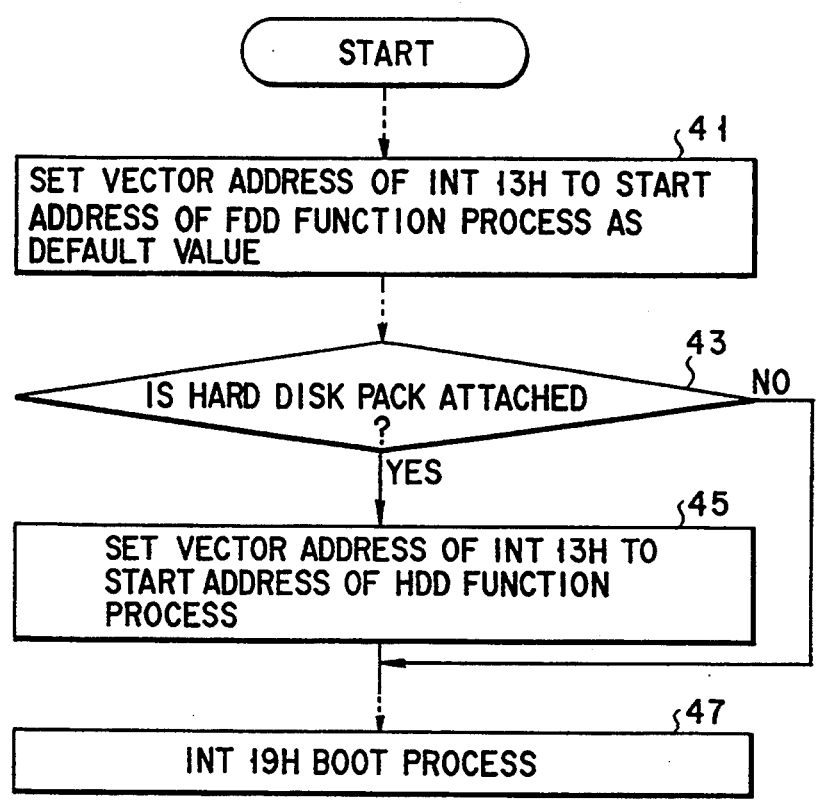
F I G. 2
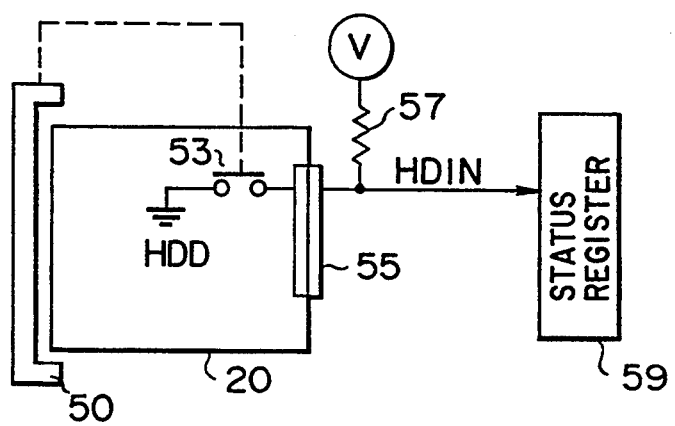
F I G. 3

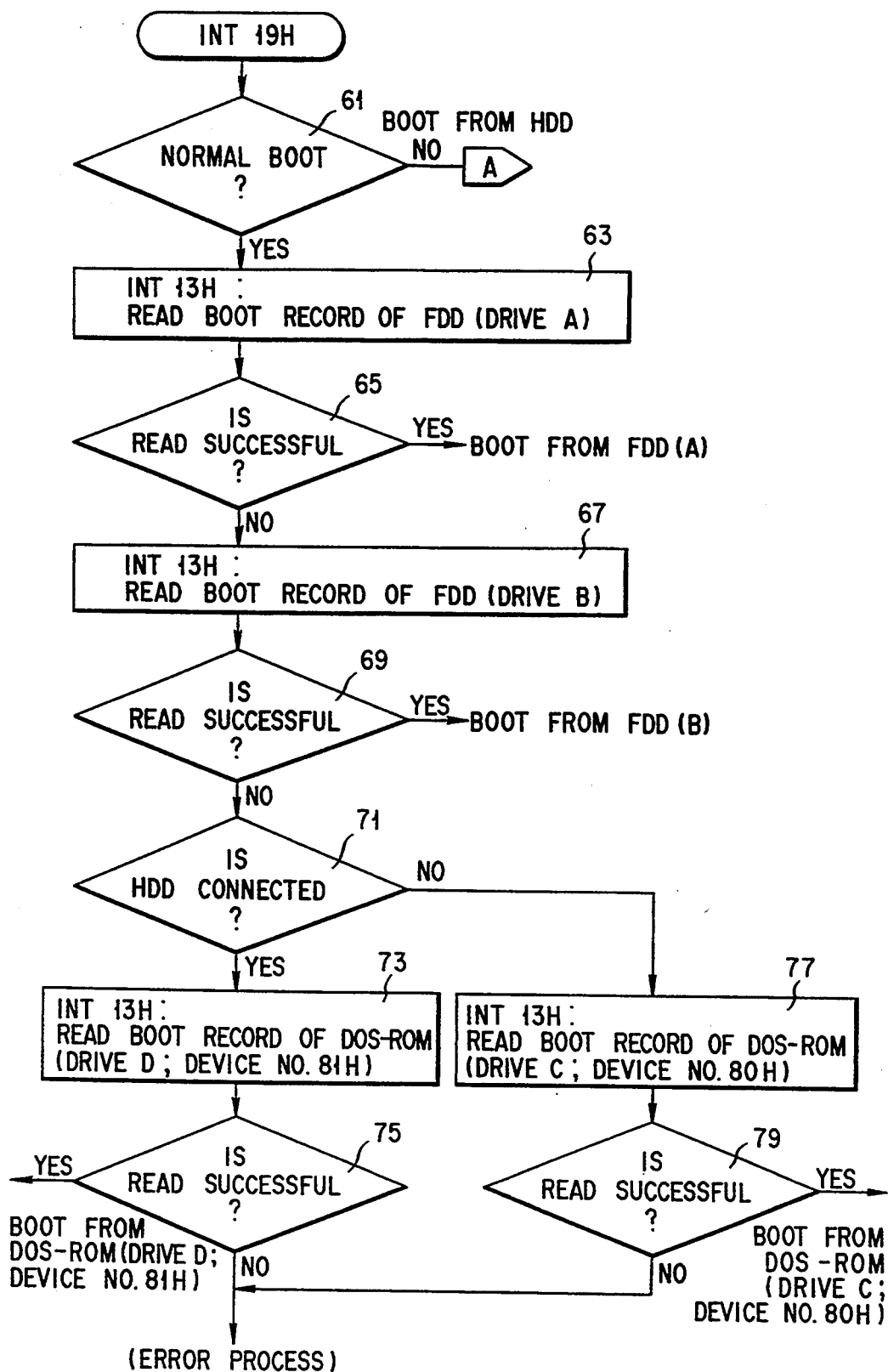
F I G. 4A

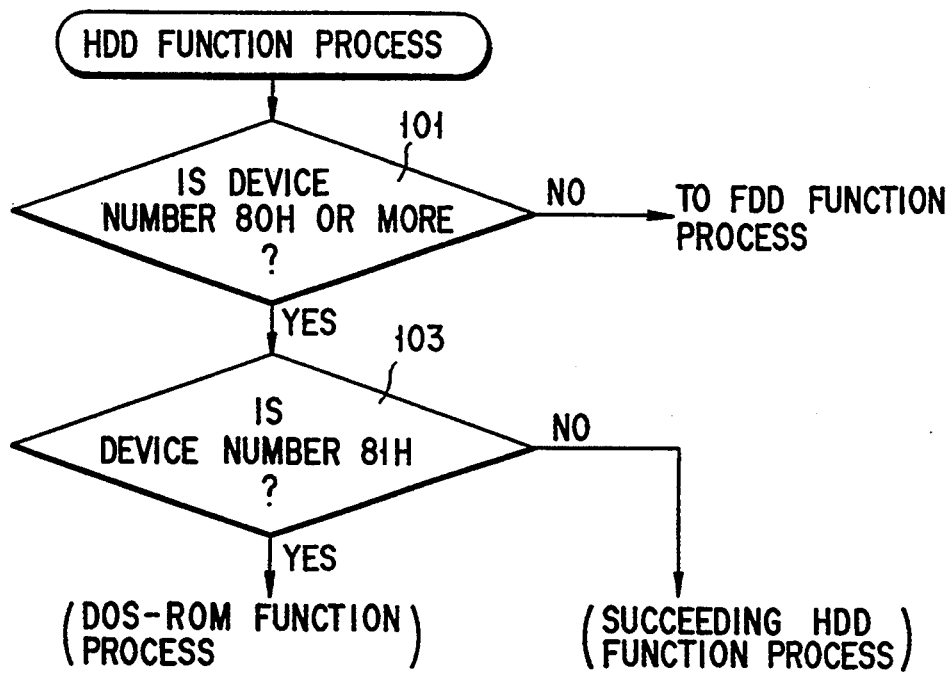
F I G. 5
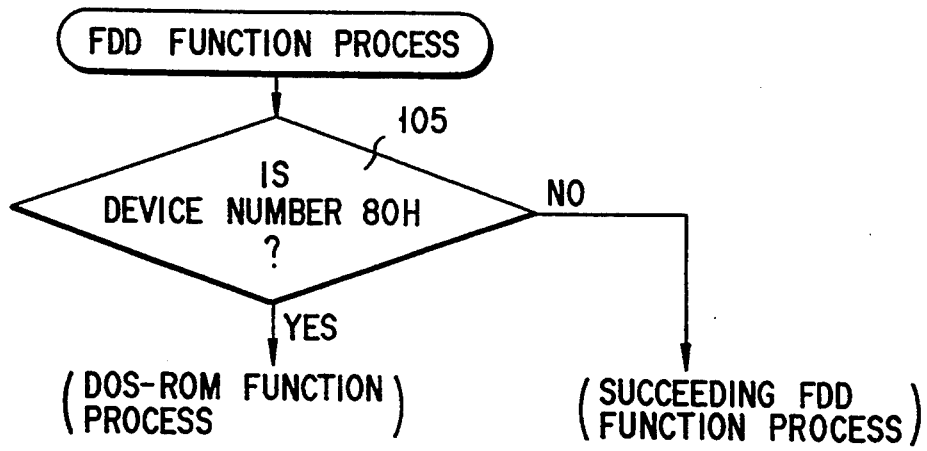
F I G. 6

[SYSTEM SET UP]

| | | |
|---|---|---|
| NUMBER OF FDDs : | ONE | TWO |
| HDD : | UNCONNECTED | CONNECTED HDD |
| BOOT PRIORITY : | NORMAL | |
| RESUME FUNCTION : | DISABLE | ENABLE |
| INCORPORATED RS-232C PORT : | COM 1 | COM 2 |
| PRINTER CONNECTION : | ABSENCE | PRESENCE |
| AUDIBLE BATTERY WARNING : | OFF | ON |
| SYSTEM SPEAKER : | OFF | ON |
| EXTENSION MEMORY PORT ADDRESS : | 208H 218H 258H 268H 2A8H 2B8H 2E8H ABSENCE | |
| HARD RAM SIZE : | 0KB 128KB 192KB 256KB 320KB 384KB 448KB 512KB | |

DO YOU WISH TO CHANGE [ YES NO ]

SELECT ITEM WITH RIGHT AND LEFT CURSOR KEY AND DEPRESS ENTER KEY

F I G. 7

PERSONAL COMPUTER CAPABLE OF CHANGING BOOT PRIORITY

This is a continuation of application No. 08/128,218, filed on Sep. 29, 1993, which was abandoned upon the filing hereof which is a continuation of application No. 07/786,795 filed on Nov. 1, 1991 issued as U.S. Pat. No. 5,274,816 on Dec. 28, 1993.

BACKGROUND OF THE INVENTION

1. Field of the Invention

The present invention relates to a personal computer having a plurality of bootstrap devices including a hard disk drive detachable to the personal computer.

2. Description of the Related Art

Compact, light-weight and low-cost personal computers have been developed. Such a personal computer is equipped with minimum functions and any other functions which are optionally provided. Some personal computers have a single floppy disk drive, others have dual floppy disk drives, and others have a single floppy disk drive and a hard disk drive. In order to set up a system, a boot process is performed. More specifically, a CPU first reads the boot record of the floppy disk drive (FDD). If the CPU cannot read the boot record of the FDD, then it reads the boot record of another FDD, if present, or reads the boot record of the hard disk drive (HDD) if the second FDD is not present. If the CPU can read the boot record of the FDD or the HDD, then it loads an operating system program stored in FDD or HDD. Thus, the system is set up.

As described above, in the prior art, the boot priority is preliminarily fixed.

Recently, a type of personal computer having a detachable hard disk pack has been developed in order to further improve the portability. This type of personal computer is provided with a disk operating system (DOS) read only memory (ROM) (hereinafter referred to as DOS-ROM). The DOS-ROM has a similar format as the hard disk drive and stores a DOS file. More specifically, if the hard disk drive is not attached to the computer's main body, the DOS-ROM serves as the hard disk drive. The device number "80H" is assigned to the HDD and the device number "81H" may be assigned to the DOS-ROM in accordance with the specification of the industry standard interface.

However, if the device number "80H" is designated while the HDD is not attached and a device having the device number "81H" is present, the boot process cannot be performed due to the constraint of the industry standard DOS.

SUMMARY OF THE INVENTION

An object of the present invention is to provide a personal computer having a plurality of bootstrap devices and which can execute the boot process in accordance with the boot priority preliminarily defined depending on the connection state of the bootstrap device.

Another object of the present invention is to provide a personal computer capable of quickly changing the boot priorities.

According to a first aspect of the present invention, a personal computer comprises: a plurality of bootstrap devices, and at least one of the bootstrap devices being detachable to the personal computer; means for detecting the connection state of the detachable bootstrap device; means for preliminarily defining the boot priority order in response to the detection of the connection state of the detachable bootstrap device; and means for setting up the bootstrap devices in the order of the boot priorities.

According to a second aspect of the present invention, a method for performing the boot process in a personal computer having a plurality of bootstrap devices, each of them having a different boot priority and one of them being a detachable type, comprises the computer steps of: a) detecting the connection of the detachable bootstrap device; and b) changing the boot priority of the bootstrap devices in response to the detection of the detachable bootstrap device.

According to the present invention, when the system is powered, the CPU refers the flag during the execution of the IRT routine to recognize the connection state of the detachable hard disk pack. Different boot priorities are prefixed depending on the presence or absence of the hard disk pack. The bootstrap devices (namely, a floppy disk drive, a hard disk drive, and a DOS-ROM) are set up in accordance with the boot priorities corresponding to the connection state of the hard disk pack.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments-of the invention, and together with the general description given above and the detailed description of the preferred embodiments given below, serve to explain the principles of the invention.

FIG. 1 is a system block diagram of a personal computer to which the boot priority changing apparatus of the present invention is applied;

FIG. 2 is a flowchart showing an IRT routine to be executed by the personal computer shown in FIG. 1;

FIG. 3 is a block diagram showing an arrangement for detecting the hard disk pack;

FIGS. 4A and 4B show a flowchart of a bootstrap process routine;

FIG. 5 is a flowchart of an HDD function process;

FIG. 6 is a flowchart of an FDD function process;

FIG. 7 shows an example of a screen menu of a system setup;

DETAILED DESCRIPTION OF THE PREFERRED EMBODIMENTS

Figure 4B:
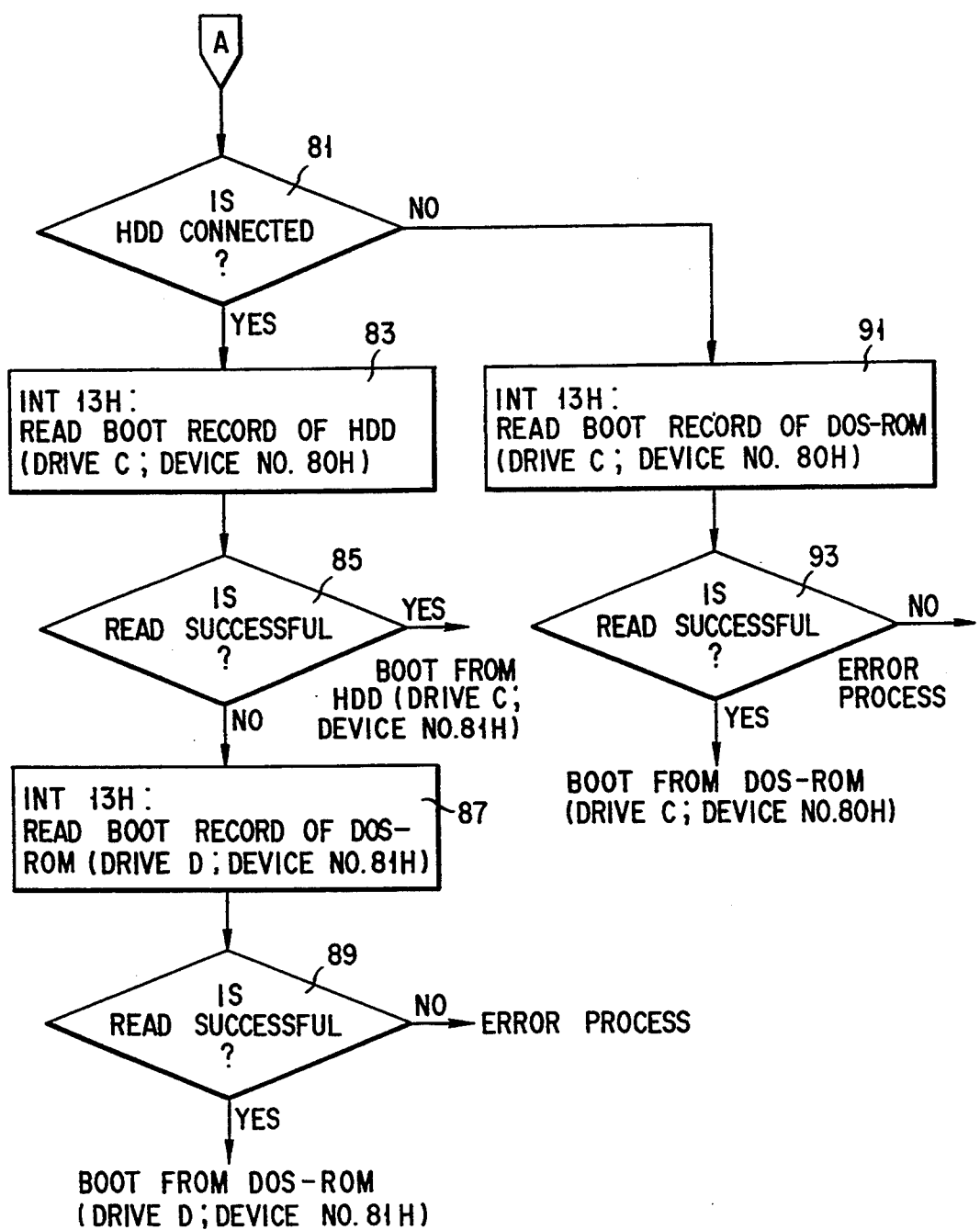

FIG. 1 is a system block diagram of a personal computer to which the boot priority changing apparatus of the present invention is applied.

As shown in FIG. 1, the computer comprises a system bus 10 and components 51 and 11 to 28 which are connected to the bus 10. These components are: a main CPU (Central Processing Unit) 11, a basic input and output read only memory (BIOS-ROM) 12, a RAM (Random Access Memory) 13 serving as a main memory, a DMAC (Direct Memory Access Controller) 14, a PIC (Programmable Interrupt Controller) 15, a PIT (Programmable Interval Timer) 16, and a RTC (Real Time Clock) 17.

The main CPU 11 controls the entirety of the system and executes the various routines represented by the flowcharts shown in FIGS. 2, 4A and 4B, 5, 6, 8, 9A and 9B. The main CPU 11 serves as a host CPU to the power control CPU 306 incorporated in the power-supply circuit 30 to be described later.

The ROM 12 stores a basic input and output program (BIOS). The BIOS includes the program shown in FIGS. 2, 4A and 4B, 5, 6, 8, 9A and 9B. The main CPU 11 executes the BIOS when the power switch of the computer is turned on to read the setup data stored in a specific area of the RAM 13 (or register) to determine the system environment, to further read a boot from a hard disk drive (HDD) 20A, and to load a Disk Operation System (DOS) program stored in the HDD 20A into the RAM 13. The RAM 13 stores the DOS program, application programs, and various data. Backup power VBK is supplied to the RAM 13 from the power-supply circuit 30. Hence, the data stored in the RAM 13 does not vanish even if the power switch of the computer is turned off.

The DMAC 14 performs a direct memory access control. The PIC 15 can be set by a program. The PIT 16 can be set by a program and supplies an interrupt signal to the main CPU 11 under control of the PIC 15 when its count reaches a value set by a program. In response to the interrupt signal, the main CPU 11 executes a vector interrupt processing routine. The RTC 17 is a timer module which has a dedicated built-in battery (not shown) and measures time; its output represents the present time.

As is shown in FIG. 1, the personal computer further comprises an extended RAM 18, a backup RAM 19, a hard disk pack 20, a floppy disk controller (FDC) 20F, a printer controller (PRT-CONT) 21, an I/O interface 22, a keyboard controller 23, a display controller 24, a video RAM 25, a DOS-ROM 26, and a power-supply interface 28. These components are all connected to the system bus 10.

The extended RAM 18 is a large-capacity memory removably inserted in the card slot formed in one side of the main body of the personal computer, and the backup power VBK is supplied to the extended RAM 18. The backup RAM 19 is also supplied with the backup power VBK and keeps storing the data required to perform a resume function. The hard disk pack 20 is removably set in a dedicated housing made in one side of the main body of the computer, and consists of, for example, a 2.5-inch hard disk drive (HDD) 20A and a hard disk controller (HDC) 20B. The floppy disk controller (FDC) 20F controls an external 3.5-inch floppy disk drive 32 and a 5-inch external floppy disk drive 33. The printer controller 21 is connected to a printer 34, the printer being externally connected to the computer. The I/O interface 22 is a universal asynchronous receiver/transmitter (UART). If necessary, RS-232C interface units are connected to the I/O interface 22. The keyboard controller (KBC) 23 controls the keyboard 36. The keyboard 36 is provided with alphanumeric keys and function keys including an F1 key 36a. The display controller (DISP-CONT) 24 controls a liquid crystal display (LCD) 37. The video RAM (VRAM) 25 is supplied with the backup power VBK and stores the video data. The DOS-ROM 26 has a similar format as the hard disk pack 20 and stores a disk operating system (DOS) program. The power-supply control interface (PS-IF) 28 connects the power-supply circuit 30 to the main CPU 11 through the system bus 10.

When necessary, an AC adapter 29 is plugged into the main body of the personal computer. It transforms the commercially available AC power into a DC power of a predetermined voltage. An expansion connector 40 is connected at one end to the system bus 10. An expansion unit is selectively connected to the other end of the connector 40. The power-supply circuit 30 (an intelligent power supply) has a power control CPU (PC-CPU) 306. A main battery 31A, which is a chargeable battery pack, is removably mounted on the main body of the personal computer. A sub-battery 31B, which is also chargeable, is incorporated into the main body of the computer.

FIG. 2 is a flowchart showing an IRT (Initialize and Reliability Test) routine which is stored in the BIOS-ROM and executed when the system is powered.

In step 41, the CPU 11 sets the vector address of INT 13H to the start address of the FDD floppy disk drive function process, shown in FIG. 6, as a default value.

In step 43, the CPU 11 determines whether or not the hard disk pack 20 is connected. This determination is made by referring to a status register 59, which is shown in FIG. 3. More specifically, as shown in FIG. 3, when the hard disk pack 20 is attached to the system main body, the lock mechanism 50 is operated to lock the hard disk pack 20 into the system main body. The switch 53 is actuated in cooperation with the operation of the lock mechanism 50. When the hard disk pack 20 is detached from the system main body, the lock mechanism 50 is released. Accordingly, the switch 53 is turned off in cooperation with the release operation. One terminal of switch 53 is connected to the ground and the other terminal thereof is connected to a specified pin of the connector 55. The specified pin of the connector 55 is connected to Vcc through a pull-up resistor 57. As a result, when the hard disk pack 20 is not connected to the system main body, the high level (logic "1") HDIN signal is output. When the hard disk pack 20 is attached to the system, a low level (logic "0") HDIN signal is output. The HDIN signal is stored in the status register 59.

As per the determination of step 43, if the hard disk pack 20 is attached to the computer main body, the CPU 11 sets the vector address of INT 13H toga start address of the hard disk drive (HDD) function process shown in FIG. 5. Thereafter, the CPU 11 executes a process INT 19H (boot process). Note that both INT 3H and INT 19H are a system call and a function request for calling a function of DOS.

FIGS. 4A and 4B show a flowchart of the boot process INT 19H. Suppose first that the hard disk pack 20 is connected and thus the vector address of INT 13H is directed toward the HDD function process. The CPU 11 determines in step 61 whether or not the boot process is a normal boot or an HDD boot. The user will have preliminarily selected either a normal boot or an HDD boot by using the system setup as shown in FIG. 7, and the setup data will have been stored in the backup RAM 19. The CPU 11 refers to the backup RAM and determines whether the normal boot or the HDD boot has been selected. If the determination in step 61 is the normal boot, the CPU 11 sets the device number "00" designating the floppy disk drive A in a specified register (DL register) and calls INT 13H. In this case, since we are assuming that the hard disk pack 20 is connected, the vector address of INT 13H has been set to the HDD function process in FIG. 5. Therefore, the CPU 11 skips to and executes the HDD function process. The CPU 11 determines in step 101 whether or not the device number is "80H" or not. Since in this case the device number has been set to "00" because we have assumed that the user selected a normal boot, the CPU 11 skips to and executes the FDD function process shown in FIG. 6. The CPU 11 further determines in step 105 that the device number is not "80H" and it executes the succeeding FDD function process. Thus, the CPU 11 reads, in the step 63, the boot record of floppy disk drive A (FDD A). (The boot record is stored in cylinder 0, head 0, sector 1.) The CPU 11 then determines in step 65 whether or not the boot record can be read out. If the boot record can be read out, the CPU 11 executes the boot process from the FDD A. More specifically, the CPU 11 loads the operating system program (OS) from the floppy disk drive A.

If the CPU 11 cannot read the boot record from the FDD A, it reads, in step 67, the boot record of FDD B. The CPU 11 sets the device number "01" designating the floppy disk drive B in the DL register and calls INT 13H. Similar to the case of floppy disk drive A, the CPU 11 executes the succeeding FDD function process passing through the steps 101 and 105. If the boot record can be read out from FDD B, the CPU 11 executes the boot process from the FDD B.

If the boot record can be read out neither from the FDD A nor from the FDD B, the CPU 11 determines in step 71 whether the hard disk pack 20 is connected. This determination is required in order to change the device number of the DOS-ROM 26. Continuing with our assumption that the hard disk pack 20 is connected, the device number of the DOS-ROM 26 should be "81H" since the device number "80H" is assigned to the hard disk pack 20. Thus the CPU 11 sets in the DL register "81H" and calls INT 13H to execute the HDD function process shown in FIG. 5. Since the content of the DL register is "81H", the determination of steps 101 and 103 are affirmative. Therefore, the CPU 11 executes the DOS-ROM function process. Accordingly, the CPU 11 reads in step 73 the boot record of the DOS-ROM 26 and determines in step 75 whether or not the boot record could be read out. If the boot record was read out, the CPU 11 loads the OS from the DOS-ROM 26 into the main memory 13. If the boot record could be read out, the CPU 11 executes an error process.

On the other hand, if the HDD boot was selected, then the CPU 11 determines in step 61 that an HDD boot should occur in step 81 whether or not the hard disk pack 20 is connected to the computer. Since we have assumed that the hard disk pack 20 is connected, the CPU 11 executes step 83. In step 83, the CPU 11 sets the DL register to "80H" and calls INT 13H. The CPU then executes the HDD function process in FIG. 5. Since the determination of step 101 is affirmative, the CPU 11 determines in step 103 whether or not the device number is "81H". Since the device number is "80H" in this case, the CPU 11 executes the succeeding HDD function. Accordingly, the CPU 11 reads in step 83 the boot record from the hard disk pack 20. If the read operation is successful in step 85, the CPU 11 executes the boot process from the hard disk pack.

If the read operation is not successful in step 85, the CPU 11 sets in the DL register "81H" and calls INT 13H. In this case, the determinations of both steps 101 and 103 are affirmative. Therefore, the CPU 11 executes the succeeding DOS-ROM function process. Accordingly, the CPU 11 reads in step 87 the boot record from the DOS-ROM 26. If it is determined in step 89 that the read operation of the step 87 is successful, the CPU 11 executes the boot process from the DOS-ROM 26. If the read operation is not successful in step 89, the CPU 11 executes the error process.

The previous discussion assumed that the hand disk pack 20 was connected.

A case wherein the hard disk pack 20 is not connected will now be described. In this case, the vector address of INT 13H is directed toward the FDD function process.

Assume first that the user has selected the normal boot. Since the steps 63 to 69 will proceed in a similar fashion as in case wherein the hard disk pack 20 is connected (described above), the description thereof will be omitted. Skipping to steps 71, the CPU 11 determines that the hard disk pack 20 is not connected. Then, the CPU 11 sets in the DL register "80H" and calls INT 13H. As a result, the CPU 11 executes step 105 in FIG. 6. Since the determination of step 105 is affirmative, the CPU 11 executes the DOS-ROM function process. Accordingly, the CPU 11 reads the boot record from the DOS-ROM 26. If the read operation of the boot record is successful, the CPU 11 executes the boot process from the DOS-ROM 26.

On the other hand we are assuming that if the HDD boot was selected and is determined in step 61, the CPU 11 determines in step 81 whether or not the hard disk pack 20 is connected. Since in this case, the hard disk pack 20 is not connected, the CPU 11 sets in the DL register "80H" and calls INT 13H. Then, the CPU 11 executes the FDD function process in FIG. 6. The CPU 11 determines in step 105 that the device number is "80H" and therefore executes the DOS-ROM function process. Accordingly, the CPU 11 reads the boot record from the DOS-ROM 26. If the read operation of the boot record is successful, the CPU 11 executes the boot process from the DOS-ROM 26.

A second embodiment of the present invention will now be described with reference to FIGS. 8, 9A and 9B.

In the first embodiment, the boot priority is changed by designating the normal boot or the HDD boot on the system setup screen shown in FIG. 7. In the second embodiment, the boot priority can be quickly changed. Therefore, a DOS command must be input in order to display the screen shown in FIG. 7, and the system must be rebooted in order to change the boot mode.

Figure 8:
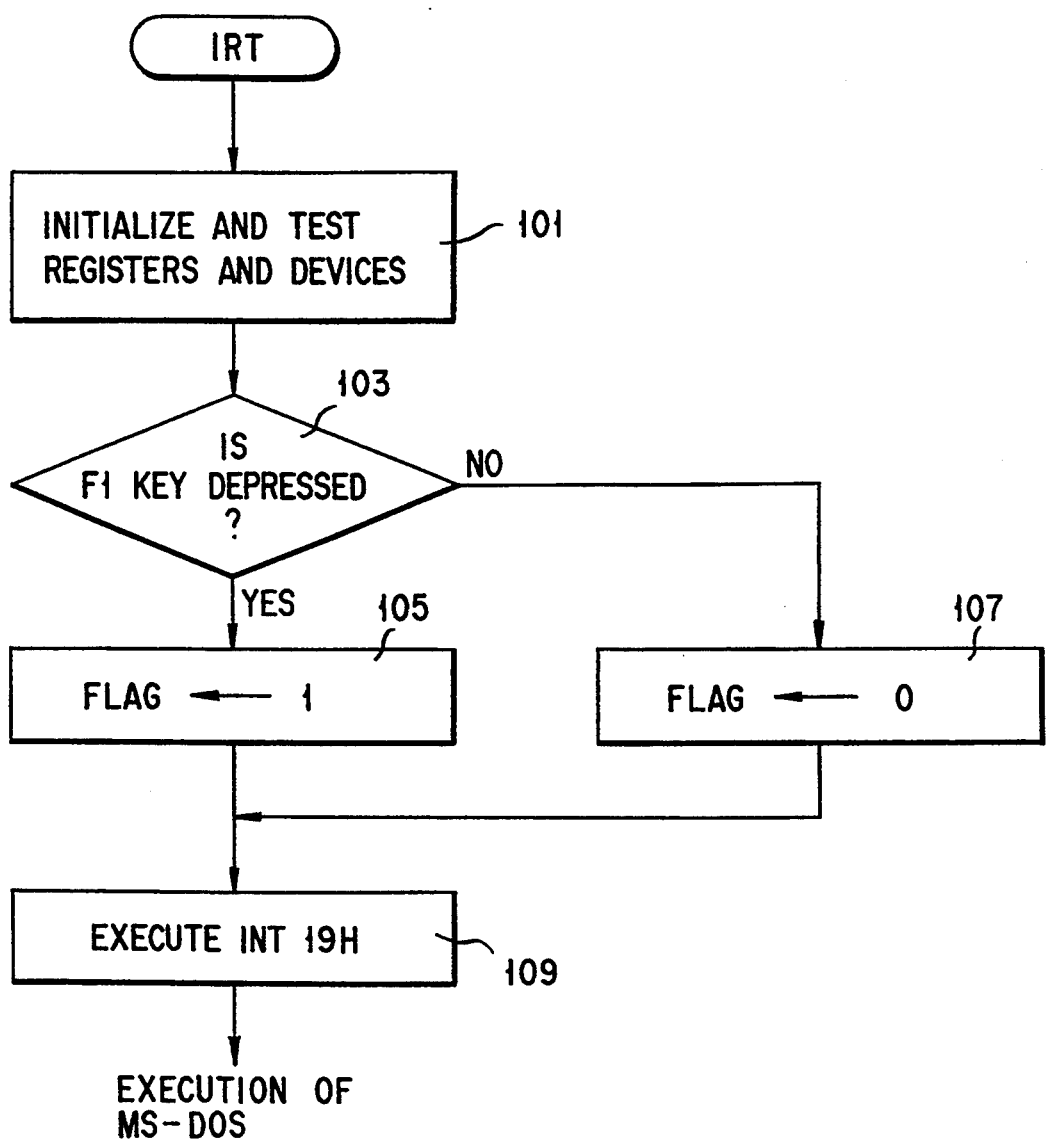
FIG. 8 is a flowchart showing an IRT routine of a second embodiment according to the present invention.
Figure 9A:
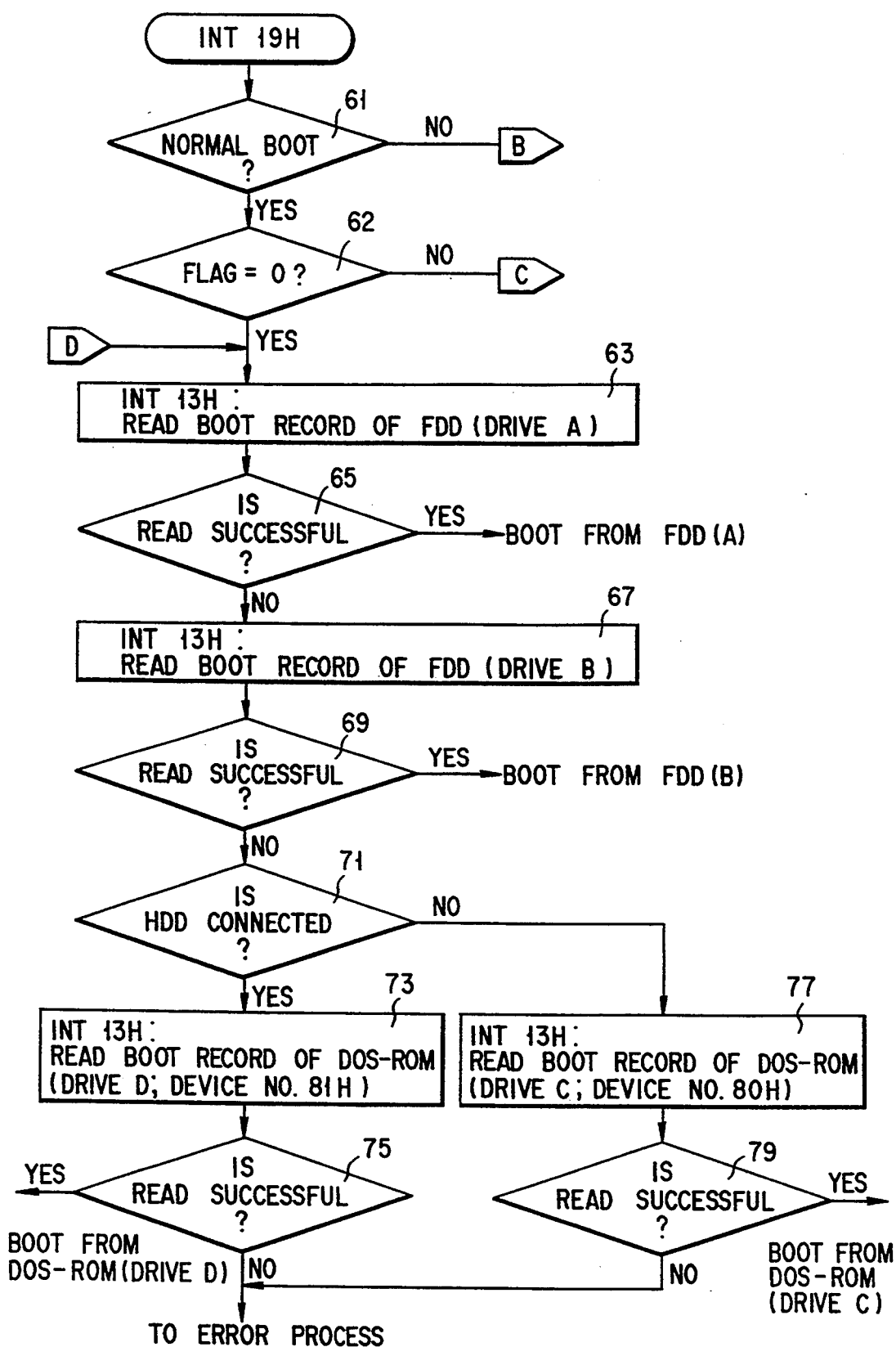
FIGS. 9A and 9B show a flowchart of a bootstrap process routine in the second embodiment according to the present invention.
Figure 9B:
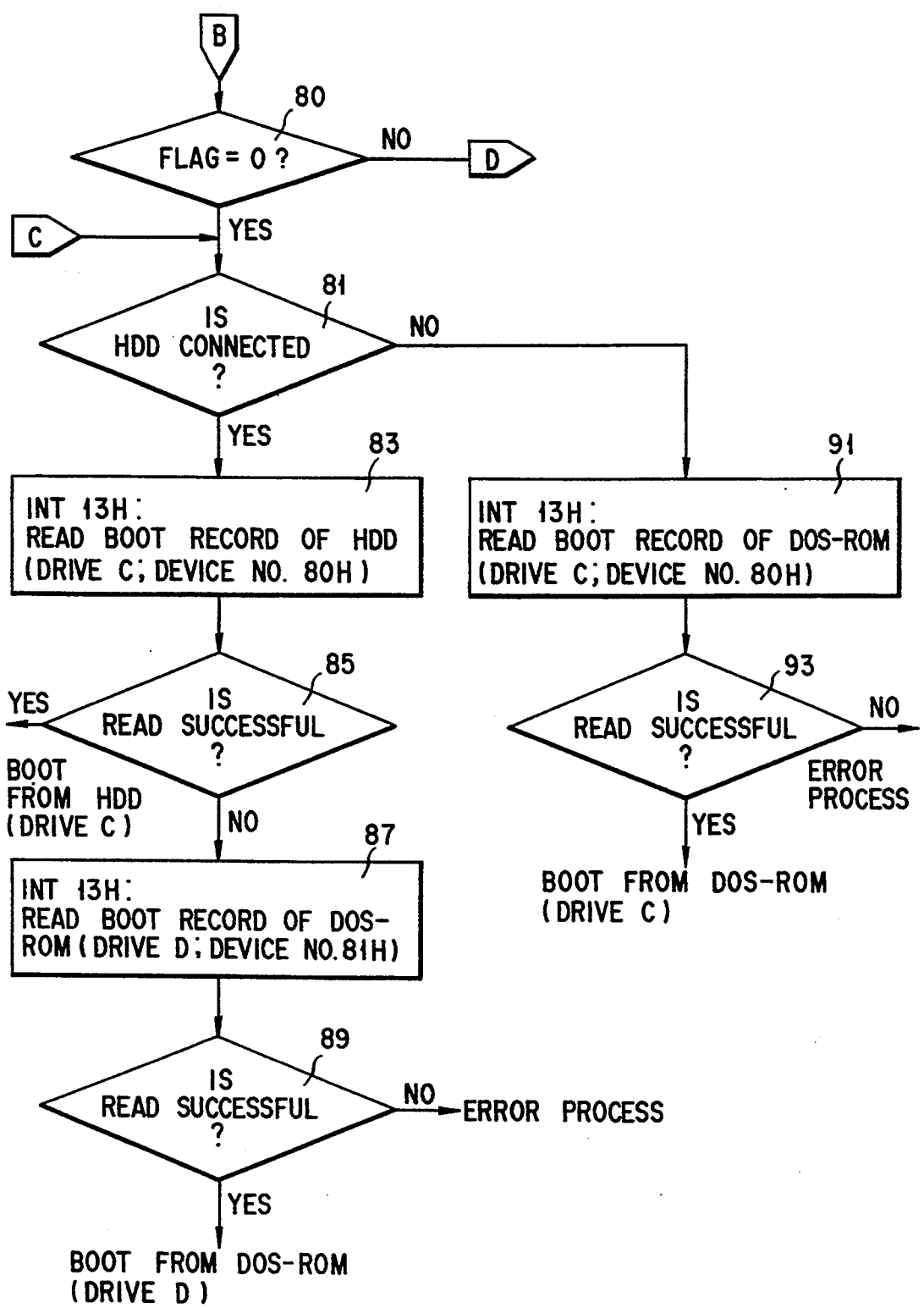

FIG. 8 is a flowchart of the IRT routine in the second embodiment. The keyboard 36 is provided with a function key (F1) 36a for designating the change of the boot priority. The CPU 11 detects the depression of the F1 key 36a in the IRT routine. More specifically, the CPU 11 initializes and tests registers and devices in step 101. Then, the CPU 11 determines in step 103 whether or not the F1 key 36a is depressed. If the determination is affirmative, the CPU 11 sets a flag, i.e., sets logic "1" in the status register 59. Alternatively, if the determination is negative in step 103, the CPU 11 sets logic "0" in the specific register. Then, the CPU 11 executes the INT 19H in step 109.

FIGS. 19A and 19B show a flowchart of the INT 19H process. The reference numerals as in FIGS. 4A and 4B denote the same steps in FIGS. 9A and 9B, and a detailed description of these steps will be omitted.

The CPU 11 determines in step 62 whether or not the flag (of the status register 59) is "0". If the flag is "0", it means that the "F1" key 36a is not depressed. Accordingly, the CPU 11 executes steps 63 to 79 which have been described with reference to FIG. 4A.

On the contrary, if it is determined in step 62 that the flag is "1", it means that the boot priority is changed from the normal boot mode to the HDD boot mode. Therefore, the CPU 11 executes the steps 81 to 93 shown in FIG. 9B.

On the other hand, if the determination is the HDD boot in step 61, the CPU 11 determines in step 80 whether or not the flag is "0". If it is determined that the flag is "1", it means that the HDD boot mode is switched from the HDD boot mode to the normal boot mode. Thus, the CPU 11 executes steps 63 to 79 shown in FIG. 9A. On the contrary, if the determination in step 80 is affirmative, the change of boot priority is not caused. Therefore, the CPU 11 executes the steps 81 to 93 shown in FIG. 9B. Thus, in the second embodiment, when the system is powered while the F1 key 36a is being depressed, the normal boot priority is changed to the HDD boot priority or vice versa.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of loading an operating system program in a computer system which includes a system bus, a plurality of bootstrap devices coupled to said system bus, at least one of said bootstrap devices storing an operating system program, which method comprises the steps of:

depressing, during an execution of an initialize routine after the computer system is powered, a special key for requesting a change of the boot priority; then changing the boot priority of the bootstrap devices in response to depression of the special key; and then accessing the bootstrap devices in the order of the changed boot priority in order to load the operating system program, wherein said steps of depressing, changing and accessing are performed within a single boot process.

2. The method according to claim 1, wherein the personal computer has a normal boot mode wherein a boot process is executed from a floppy disk drive, and a hard disk drive boot mode wherein the boot process is executed from a hard disk drive, the method further comprising the steps of:

designating a boot mode by selecting either the normal boot mode or the hard disk drive boot mode, the boot mode being displayed by executing a setup utility of the computer system;

storing the selected boot mode in second storage means; and accessing the bootstrap devices by the boot mode stored in the second storage means, at power-on of the computer system.

3. The method according to claim 2, further comprising the steps of:

determining whether the special key is depressed; and changing the normal boot mode to the hard disk drive mode or vice versa when the special key is depressed.

4. The method according to claim 1, wherein one of the bootstrap devices is a detachable type, further comprising the steps of:

detecting the connection of the detachable bootstrap device;

changing the boot priority of the bootstrap devices in response to the detection of the detachable bootstrap device; and accessing the bootstrap devices in the order of changed boot priority.

5. The method according to claim 4, wherein one of the bootstrap devices being DOS-ROM device, and further comprising the step of changing the device number of said DOS-ROM device in response to the detection of the detachable bootstrap device.

6. The method according to claim 1, further comprising the steps of:

setting a data flag representing the special key being depressed in first storage means; and changing the boot priority of each of the bootstrap devices in accordance with said data flag stored in the first storage means.

7. The method according to claim 1, further comprising the steps of:

determining whether a detachable hard disk drive is attached in the computer system; and resetting the boot vector address to the start address of a hard disk drive boot process when it is determined that the hard disk is attached.

* * * * *